United States Patent [19]

Heeg

[11] Patent Number: 4,707,204

[45] Date of Patent: Nov. 17, 1987

[54] METHOD OF MAKING A FURNITURE FRONT ELEMENT

[75] Inventor: Otto Heeg, Ruedigheimer Strasse 9, D-6450 Hanau/Main, Fed. Rep. of Germany

[73] Assignees: Portas Deutschland GmbH, Frankfurt; Otto Heeg, Hanau, both of Fed. Rep. of Germany

[21] Appl. No.: 631,759

[22] Filed: Jul. 17, 1984

Related U.S. Application Data

[63] Continuation-in-part of Ser. No. 324,022, Nov. 23, 1981, abandoned.

[30] Foreign Application Priority Data

Nov. 25, 1980 [DE] Fed. Rep. of Germany ... 8031386[U]
Mar. 11, 1981 [DE] Fed. Rep. of Germany ... 8106975[U]

[51] Int. Cl.[4] .......................... B32B 31/10; B32B 7/08
[52] U.S. Cl. .................................. 156/91; 52/309.15; 52/456; 52/762; 52/780; 52/823; 52/826; 144/347; 144/353; 144/365; 144/368; 156/257; 156/258; 156/293
[58] Field of Search ...................... 52/309.15, 456, 656, 52/727, 762, 780, 823, 826; 144/347, 353, 365, 368; 156/91, 257, 258, 293

[56] References Cited

U.S. PATENT DOCUMENTS 2,816,632 12/1957 Nardulli .............................. 52/823
3,533,190 10/1970 Hilfinger et al. ................. 52/656 X Primary Examiner—Robert A. Dawson
Attorney, Agent, or Firm—Dennison, Meserole, Pollack & Scheiner

[57] ABSTRACT

Proposed is a furniture front element like a cabinet door, of which the frame leg members are joined in mitre cut and without any screwed connection. The lengths of the leg members are infinitely adjustable and the frame filling pieces are designed as a storage means in order to be able to change the front surface of the element to the desired extent.

2 Claims, 16 Drawing Figures

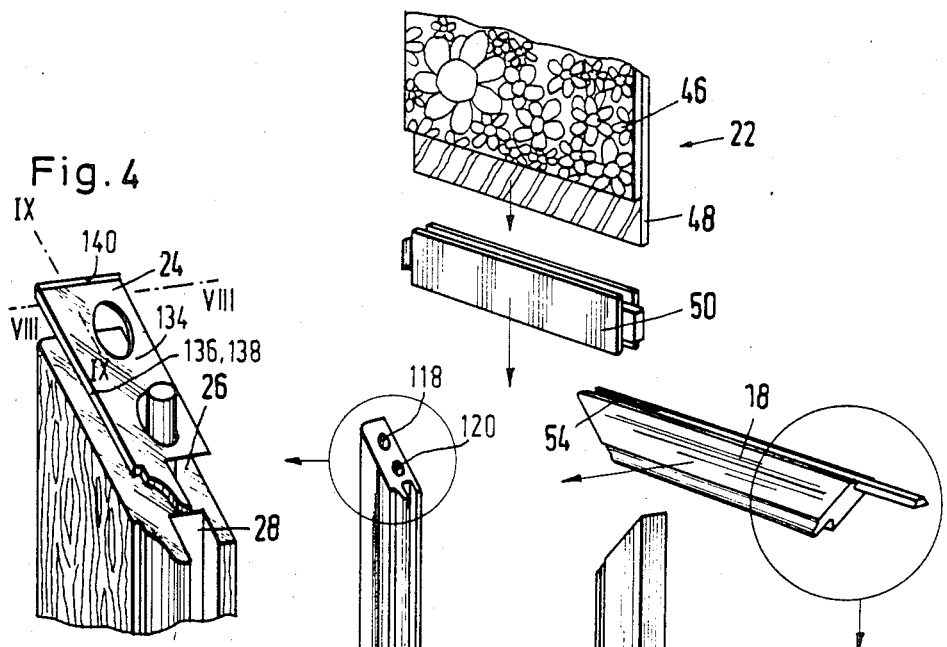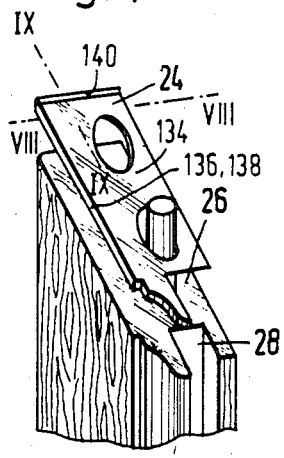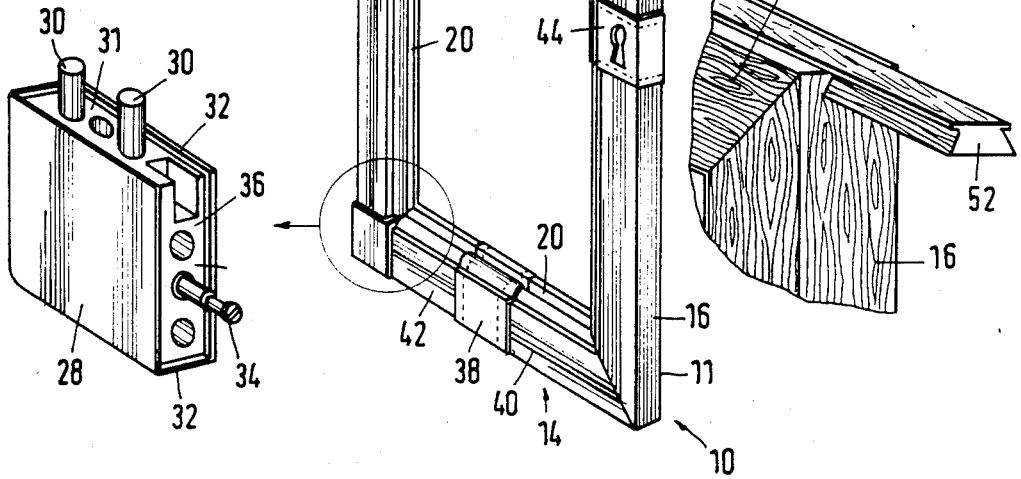

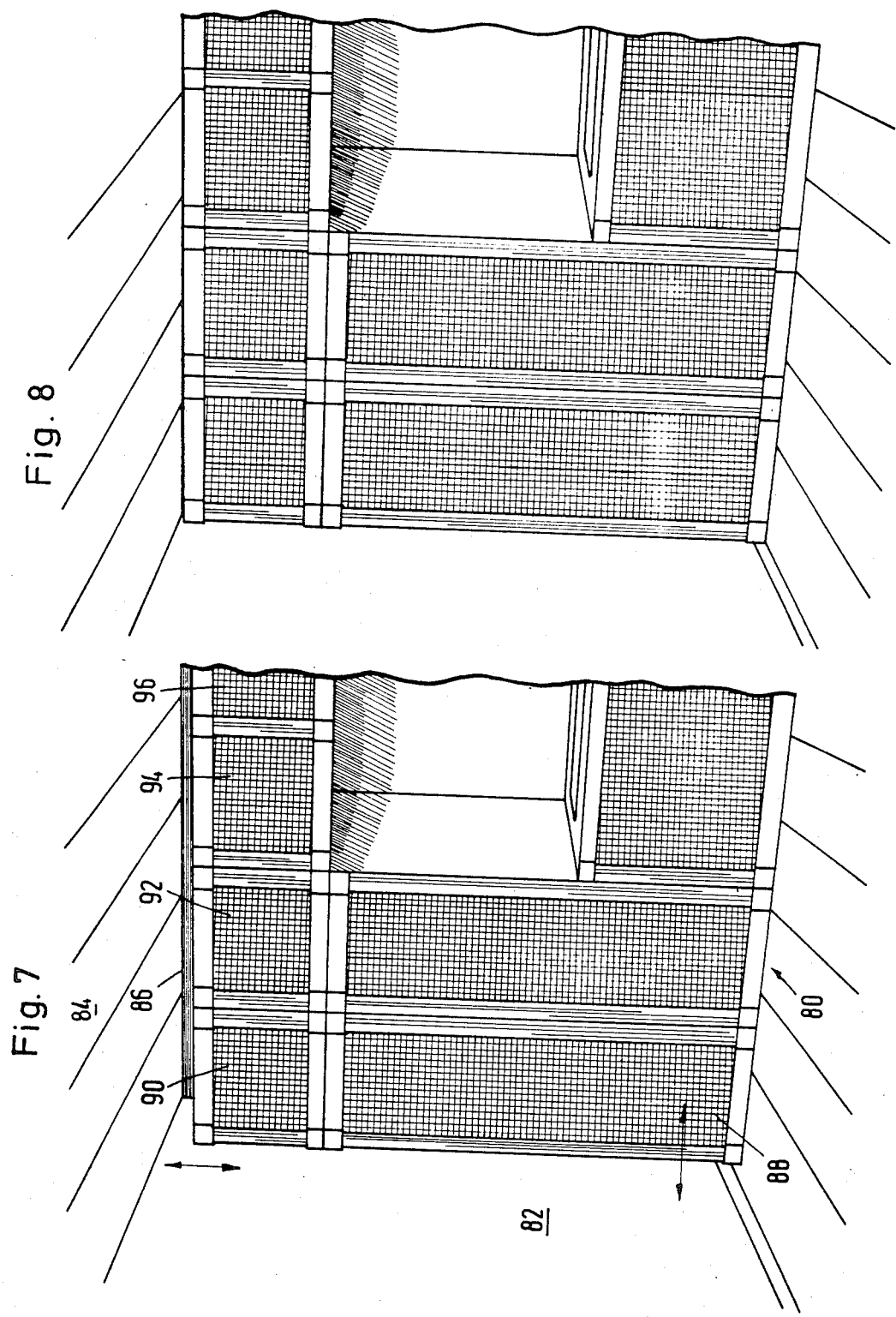

METHOD OF MAKING A FURNITURE FRONT ELEMENT

This application is a continuation-in-part of application Ser. No. 324,022, filed Nov. 23, 1981, now abandoned.

The invention relates to a furniture front element, preferably similar to a cabinet door or front surface of drawers, head or foot parts of beds or the like, consisting of a filling piece surrounded by a frame.

BACKGROUND OF THE INVENTION

There are known many frames of different construction, which can be used as door frames, window frames, frames of cabinet doors or picture frames. Thus the U.S. Pat. No. 3,533,190 (Hilfinger) describes a metal frame for a furniture element, of which the leg members are of a fixed length. It is not possible to mount a single visible decor element in this metal frame, said decor element on its part being received by holding means firmly connected with the frame. Such a frame is meant to replace known wooden frames in order to obtain better solidity. As the frame is made of metal, it is always designed for one size only. In manufacturing respects it is not possible at low cost to make frames of different size and having metal leg members in series. Further the metal frame according to U.S. Pat. No. 3,533,190 has the disadvantage that the fittings are visible. Therefore it is necessary that the body of the furniture element, too, must remain visible. An appropriate detachment, however, is not desirable especially for kitchen furniture. Also there is no chance offered of adapting the outside of a cabinet having a frame according to U.S. Pat. No. 3,533,190 to the current fashion, for example, as the filling piece mounted in the frame cannot be exchanged.

In U.S. Pat. No. 2,816,632 (Nardulli) a window frame is described being composed of metal profile ledges. Compensating elements are imbedded in the metal frame legs, for the length of which the frame can be varied. It is obvious that this will not provide an infinite variability. The frame leg members themselves are joined by square angles and screws so that the glass pane held by the frame cannot be easily exchanged. Likewise a respective joining of wooden frames is not possible since it is very difficult to drill square holes. Aside from the fact that metal frames are absolutely unsuitable for kitchen furniture, as they are easily susceptible to corrosion due to the dampness in those rooms, it is not possible to mount the fittings so that they will not show. Even if such a frame is made of aluminum, which would of course solve the corrosion problem, a respective frame, however, would be absolutely inappropriate in a living room area as a foreign body in visual respects.

In U.S. Pat. No. 3,184,802 (Levy) a wooden frame is described in which a single decor element can be placed within the frame, where the frame legs are butt joined. In order to remove or, respectively, mount the decor element, it is necessary that one leg of the frame, namely an upper or lower frame leg, be specially designed and thus differs from the other frame leg members. In this case by U.S. Pat. No. 3,184,802 it is suggested that one frame leg is composed of two sections, of which one is firmly glued together with the adjacent frame legs. In this manner it is not possible to provide suitable frames of different dimensions at low manufacturing expense. There is likewise no possibility offered of inserting a filling piece in the frame of which both sides are protruding beyond the groove, since the filling piece at least at one of its sides is limited in its extension by the semi-leg member.

The U.S. Pat. No. 3,363,390 (Crane) refers to a window frame, of which the leg members are made of synthetic material. In this frame no plane elements presenting different decor effects are inserted as filling pieces. The leg members themselves are joined by means of screws that are visible from the outside. Merely for optical reasons such a frame is completely unsuitable for a furniture front element. The frame leg members themselves are not continuously adjustable.

The U.S. Pat. No. 3,131,440 (Leeser) describes a frame for use in a door wherein the panes can be placed. Here a frame construction has been selected calling for a rather expensive manufacture, which is not suitable for furniture elements. Also no possibility is offered for substituting the inner portion or filling piece of the frame without any difficulty. The frame itself also is not an integral construction per se.

The U.S. Pat. No. 3,451,153 (Dohanyos) relates to a framing device principally for a picture. Although the frame leg members are variably designed, this is, however, directly detectable optically. The frame leg members themselves do not have a mitre cut relative to each other.

The U.S. Pat. No. 3,783,567 (Ollis) shows a frame being composed of leg members joined with each other by means of screws. Alone this fact excludes any possibility of exchanging the filling piece of the frame without any difficulty. This is also not intended as the frame according to U.S. Pat. No. 3,783,567 receives fireproof glass panes and thus is not be used as a furniture element which as to its decor effect can be easily adapted to current fashions without causing any problems.

SUMMARY OF THE INVENTION

It is an object of the present invention to provide a furniture front element, especially a cabinet door, in such a manner that it can be adapted to diverse sizes without requiring much expense. Also the possibility shall be offered of obtaining varied decor effects without the necessity for extensive mechanical skills. Further the furniture front element may be manufactured in a quasi industrial manner, where, however, an individual adaption to the requirements in each case can be made without any difficulty. Thus it shall be a combination of handicraft work and industrial production. Finally a furniture front element may be provided of which the outward appearance can be changed at any time and as often as one likes without causing any problems, without having to renew the element itself.

Especially the furniture front element shall be suitable for restoring old furniture in order to obtain new furniture in visual and functional respects.

According to the invention this problem is solved by a method for manufacturing a furniture front element with a frame and a filling piece insertable in such frame, comprising:

(a) manufacturing the frame legs by the cutting of profile ledges with a longitudinally extending groove in true mitre-cut, (b) placing (first) boreholes extending in a longitudinal direction of the frame legs and starting from the cutting surfaces of the profile ledges, where the front surface of the profile ledges is used for standardization of the boreholes, (c) placing two (additional) boreholes starting from the back side of the frame legs, where the two additional boreholes intersect with the first boreholes extending in longitudinal direction, (d) sealing the sectional planes, (e) placing the housings of eccentric-joint fittings in the two additional bores, (f) putting angle dowels into the first bores, (g) joining and adjusting the upper, lower, and a first lateral frame leg member by means of the angle dowels to the end sections of same receiving housings of the eccentric-joint fittings, (h) placing the filling piece, being composed of several plate-shaped elements having different decor effects, into the groove of the assembled frame legs, (i) joining the other lateral frame leg with the upper and lower leg members by means of respective additional eccentric-joint fittings.

By the teaching according to the invention, for the first time there is provided a furniture front element that can be assembled without requiring any screws whatsoever. Further the invention offers the possibility of infinitely varying the size of the frame even into the millimeter area. Finally a storing of diverse front surfaces takes place, which on their part can be easily substituted without any difficulty and little manipulation.

According to the invention it is suggested to use profile ledges which are available by the meter, which are cut to length in miter-cut in such a manner that they will meet the desired frame measurements. Thereby, according to the invention, the joining of the frame leg members is made without any screws, thus guaranteeing that the front surfaces of the frame legs will grade into each other in alignment. To this effect the front surface of the frame legs has been selected as starting point for drilling the holes to receive the angle dowels for joining the leg members. This is important since the profile ledges themselves could vary as to their thickness. On the other hand, however, if one takes the back side of the legs as starting point for the boreholes, the front surfaces could present steps relative to each other.

It is further important that the sectional planes are sealed. Especially when used in kitchens, otherwise moisture would penetrate into the frame legs through the sectional planes, which would cause them to swell. The same applies to frame leg members being covered by a synthetic foil. If moisture penetrates into such legs, then the synthetic foil cover would separate itself from the wooden core.

In order to align the legs without any difficulty it is suggested to join the legs by means of rapid-action locks like eccentric-joint fittings, where the angle dowels in the housings of the eccentric-joint fittings are flattened in such a manner to prevent a turning of the angle dowels round the longitudinal axis of the leg members. Thus the leg members can be adjusted relative to each other without any problems. A readjustment of the legs is not required. Thereby it is guaranteed that notwithstanding the workmanlike assemblies of the legs, the final product is faultless.

Due to the fact that the filling piece is composed of various elements displayng different decor effects, an unproblematic adaption to the current fashion is provided. Thus, for example, the elements forming the filling piece can be adapted to the coloring of wallpaper, curtains or upholstered furniture. Consequently this offers the advantage that one will not have to renew the furniture pieces every time when a new style comes into fashion. All one has to do is to exchange the filling pieces being stored in the frame according to the invention.

When using the furniture front element according to the invention as a door, the fittings are arranged on the back side of the frame leg members so that they are not visible. Thus the entire body of a furniture piece can be covered by the furniture front element according to the invention. This is not possible especially with frames of metal, as evidenced by the prior art.

Furthermore the furniture front element is variably designed as far as height and/or width are concerned. This can be achieved in such a manner that the leg members can be composed of sections being displaceable relative to each other. This will result in the advantage that even if the leg members are inaxactly cut to size, an adaption to the actual situation can be made without any difficulties. This applies likewise to the case where an error was made in the measuring of furniture front elements, which with conventional front element constructions, and especially with such made of metal, would lead to the consequence that the final product will be faulty and no longer usable. According to the invention hereby an infinite variability of the leg members is effected. This infinite varying in this respect can amount to a few millimeters only. If, for example, a body for 2 revolving doors is measured, it can happen that even minor measuring errors would result in either a too small or too large a distance of the doors to each other. Here it is necessary that an infinite variation within the millimeter range can be effected. On the one hand, the infinitely variable modification of length can be realized in that leg sections of desired length can be inserted in the respective frame leg members. These leg sections have recesses in their front surfaces. These recesses then can receive the edge areas of the adjacent sections of the frame leg members and are adjustable in depth to suit this purpose. Thereby the leg sections can be displaced relative to each other by means of adjusting elements. In addition, locking and/or holding devices can be mounted in the respective leg sections. Likewise a door lock can be arranged in a suitable section of the leg member if the furniture front element according to the invention is used as a cabinet door.

Further, in order to correct any possible inaccuracies of fit, a disk-shaped element or shim can be placed in the mitre cut. To this effect this element has sections extending along the surfaces of the frame leg members, which cover those to the desired extent. Consequently such an element is configured like a ridge being arranged between the sectional planes, where sections from said ridge are extending essentially in parallel to the visible outer surfaces of the frame leg members. It is obvious that by said element any undesired open spaces between the abutting legs are covered.

The filling piece is exchanged by removing a lateral leg member, and that one not being provided with hinges or the like, by means of which the furniture front elements are joined on the body of a cabinet or the like. By exchanging the filling piece via a lateral leg, there will be the advantage of doing this from the floor side even in the case of high doors. Since by the removal of the leg the inner groove of the other legs is exposed, the filling piece outside of the groove can be of a thickness exceeding the inner width of the groove. Therefore a filling piece can be inserted of the upholstery kind or a wooden panel presenting an especially attractive outward appearance.

DESCRIPTION OF THE FIGURES OF THE DRAWING

Further details, advantages and characteristics of the invention will appear from the claims as well as the following description of a preferred embodiment and examples, without thereby restricting the scope of the invention.

As to the drawings:

FIG. 2 shows a furniture front element in exploded perspective, according to the invention, FIG. 3 shows in perspective the construction of a corner element of the furniture front element according to FIG. 2, FIG. 4 shows a further arrangement of a corner element in perspective according to FIG. 2, FIG. 5 is an enlarged fragmentary perspective view of a furniture front element, FIGS. 7 and 8 show a practical employment of furniture front elements according to the invention, e.g. in connection with bathroom furnishings.

DETAILED DESCRIPTION OF THE ILLUSTRATED EMBODIMENT OF THE INVENTION

Figure 1:
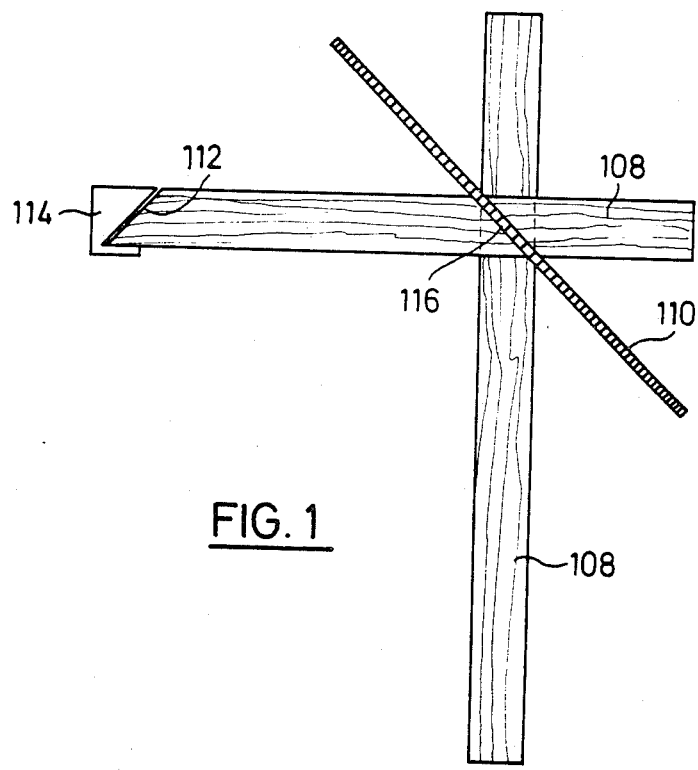
FIG. 1 shows the principle of manufacturing frame leg members.
Figure 12:
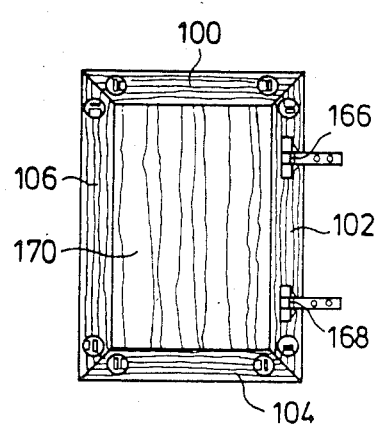
FIGS. 12 to 14 show the back sides of a furniture front element in different phases of the mounting.
Figure 13:
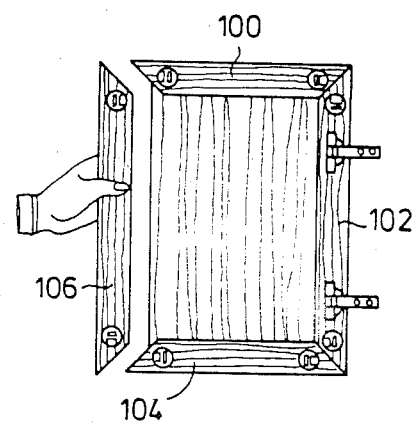
Figure 14:
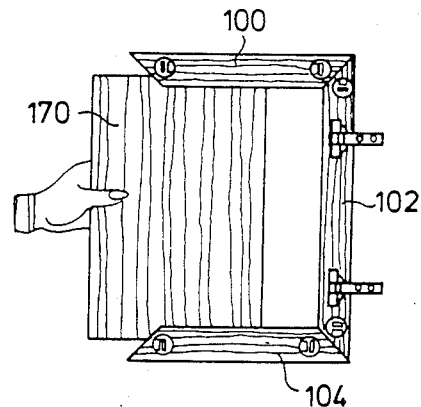

FIG. 1 is a diagrammatic outline of how to manufacture the frame legs 12, 14, 16, 18 according to FIGS. 1 to 4, or the legs 100, 102, 104, 106 according to FIGS. 12 to 14 in true mitre-cut and exact fit. Thus a normally blunt-cut profile ledge 108 having a groove extending in longitudinal direction is arranged at an angle of 45° to a cutting tool like the saw-blade 110 as shown as the bottom piece in FIG. 1 and is cut. During this operation the groove is on the right side, thus facing the saw-blade 110. Subsequently the profile ledge 108 with the mitre cut 112 is placed in a cutting-guide 114, of which the distance to the saw-blade 100 is selected in such a manner that the outer leg surface 116 has the length required for the frame to be manufactured. Then the next true mitre-cut is made at the end 116 facing the cut 112. As the saw-blade 110 is clearly coordinated with the guide 114 and likewise the first cut 112 is unambiguously coordinated with the saw-blade 110 for obtaining a true mitre-cut, it is always guaranteed that the legs cut to size according to the principle diagram shown in FIG. 1 will have the desired length. From the diagram it also appears that even the cutting to size of legs of different lengths will cause no problems. To this effect it is only necessary that the guide 114 completely receiving the cut 112 is displaced relative to the saw-blade 110 to the desired extent.

Figure 15:
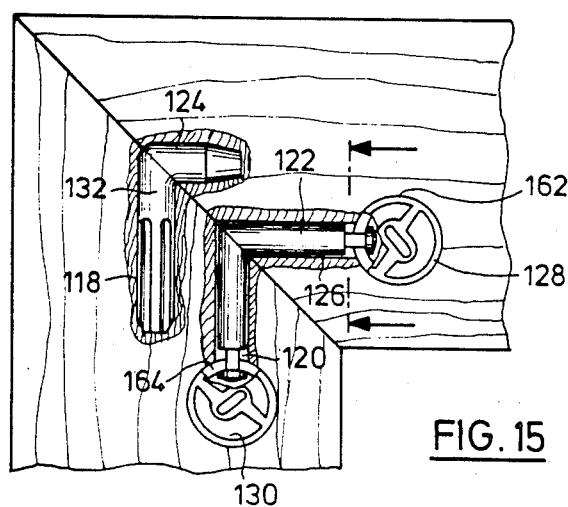
FIG. 15 is an enlarged detail showing of a joining of frame leg members by means of an eccentric-joint fitting.

Thereafter boreholes 118, 120, 122, 124 (FIGS. 2 and 15) are drilled in the frame leg members manufactured in the above manner, in order to place therein angle dowels 126 combined with housings 128, 130 of eccentric-joint fittings, as well as angle dowels 132 of synthetic material (FIG. 15).

Even if the profile ledges should have the same thickness, it frequently occurs that they will vary among each other. However, notwithstanding this fact, in order to guarantee that the visible surfaces of the legs 12, 14, 16, 18 or, resp. 100, 102, 104, 106 will fit into each other in alignment, the boreholes 118, 120, 122, 124 are drilled in the leg members starting at a defined distance to the visible front surface of said legs. This will guarantee that the dowels 126, 132 join the legs together in such a manner that the front surfaces define a closed smooth surface.

In FIG. 2 a furniture front element shown generally at 10 according to the invention is shown being composed of a frame 11 made up of the legs 12, 14, 16 and 18, which legs are made of profile ledges having a groove 20 in their longitudinal direction. Hereby the legs, in respect to the groove 20, are attached to each other in such a manner that the grooves of the individual legs will define a continuous inner groove. A filling piece 22 is placed into this inner groove and store 2 therein.

Figure 16:
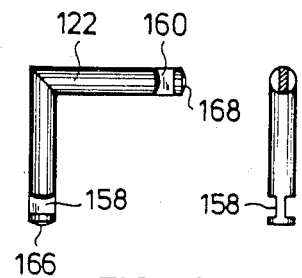
FIG. 16 shows an angle dowel according to FIG. 15 in side and front view.

The detail views of FIGS. 3 and 4 illustrate different modes of construction of corner connections between the legs 12 and 14 or, 12 and 18. Thus the adjacent legs preferably should form a true mitre in the corner area as shown in FIG. 4. Thereby the connection between the adjacent legs 12 and 18 can be made like a tenon joint or a groove-and-tongue system, or by plug or automatic catches. In a preferred embodiment a connection between the legs is effected by means of eccentric-joint fittings, as described in the text relating to FIGS. 15 and 16.

In order to compensate for inaccuracies of fit in the mitre-cut between the legs 12 and 18, a leaf-like compensating or covering element or shim 24 can be placed in said legs being adapted to the profile of the abutting legs. Therefore the element 24 also has a recess 26 in the area of the groove 20 so that the continuous inner groove will not be interrupted.

Figure 9:
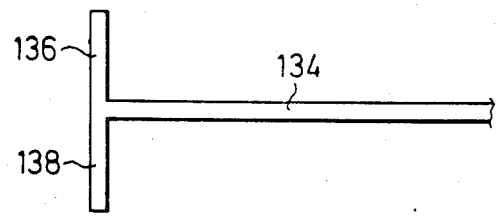
FIG. 9 is a sectional view along the lines VIII—VIII in FIG. 4.
Figure 10:
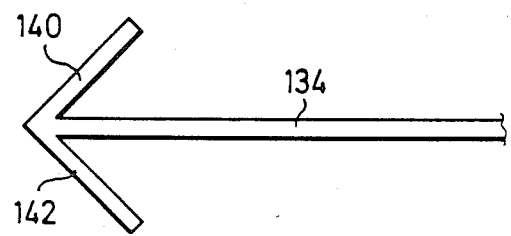
FIG. 10 is an enlarged sectional view along the lines IX—IX in FIG. 4.

FIGS. 9 and 10 show sectional views of the leaf-like covering element 24 along the lines VIII—VIII or, IX—IX in FIG. 4.

Thus one can see that the leaf-shaped element is composed of a plane basic element 134 arranged between the mitered surfaces of the adjacent legs 12, 18, of which the sections 136, 138 or, resp. 140, 142 are extending which run along the respective surfaces of the adjacent legs 12, 14. Hereby it is guaranteed that there can be a distance between the basic element 134 and the adjacent legs 12, 18 without this being visible from the outside. It is obvious that the sections 136, 138 are arranged at a right angle relative to the basic element 134, as these shall cover the front surfaces of the legs 12, 18 fitting into each other in alignment. The edge surfaces of the legs 12, 18 are covered by the sections 142 and 140 describing a right angle relative to each other as seen best in FIG. 10.

The corner joint of FIG. 3 shows an alternative type of construction, where the legs (14 and 12) are butt-joined to a corner element 28. Here the corner element 28 is a prefabricated block-like element, which can be joined to the adjacent legs by means of tenons 30 or an adjustable joint 34. Especially by the adjustable joint 34, a spacer element is provided at the same time in order to make the distance variable between the leg 14 and the corner element 28, thus likewise providing a means to adjust eventual inaccuracies of fit. However, in order not to let different distances between the leg 14 or, 12 and the corner element 28 become visible, the edge areas of the legs are engaging the corner element 28. To this effect, the terminating surfaces of the corner element 28 extend as against the basic body 36 provided with the tenons 30, or resp. the adjustable joint 34. According to FIG. 3, the corner element 28 has also a continuous fillet 32 being flush with the surface outwardly in order to provide the recesses 31 and 33 into which, as mentioned before, the edge areas of the legs 12 and 14 (resp. 42) project. In relation to the height of the surrounding fillet 29, the legs 12 or, resp. 14 can be displaced to the corner element 28 without this becoming visible on the outside.

According to FIG. 2 the leg 14 further is provided with a leg section 38 having recesses in its front area in order to receive the edge areas of the adjacent leg sections 40, 42. Consequently between the section 38 and the adjacent sections 40 and 42 a construction is realized as it has been described in connection with the corner element according to FIG. 3. Hereby the displacement toward each other between the individual leg sections preferably can be effected by means of adjusting elements not shown.

Due to the fact that the sections 38, 40, 42 can be displaced relative to each other, according to the invention it is possible to make the front element 10 variable in height and/or width, whereby a possibility of compensation is offered especially in the event of an error occurring when measuring a piece of furniture to be faced with a furniture front element according to the invention or, respectively, if inaccuracies occur during cutting it to shape.

As illustrated in FIG. 2, the leg 16 also has a section 44 not only being relatively displaceable with respect to the adjacent sections (like the section 38 of the leg 14) but in addition having a lock embedded therein. Thereby the practicability is given of employing a respective furniture front element likewise as a locking furniture door.

All of the above elements, namely legs, adjustable sections or compensating means, are prefabricated in series so that the furniture front element 10 can be pieced together in a manner like a modular system.

FIG. 2 further shows that the upper leg 18 as a unit can be detached from the frame 11. (However, preferably one lateral leg is made detachable as described in detail in connection with the FIGS. 12 to 14). The removal of one leg as a unit offers the advantage that the filling piece 22 to be inserted can be quickly exchanged.

According to one of the characteristics of the invention, the filling pieces preferably can be composed of single elements arranged one on top of the other and/or one after the other. If the single elements are arranged one after the other, they exclusively serve the purpose of a decor effect. However, if single elements are used being arranged one on top of the other, then in addition to the decor effect they can also serve a functional purpose.

In the embodiment shown it is indicated that the filling 22 is composed of individual elements 46 and 48 arranged end to end, which elements can be placed into the continuous inner groove 20 after having removed the leg 18. Thereby at first e.g. the element 48 is placed into the groove 20 in order to subsequently push in a ledge 50 with a H-profile. As a consequence, the upper edge area of the element 48 is received by the groove of the H-profile 50. The lower edge of the element 46 is placed into the other groove of the H-profile of the ledge 50. In such a manner the transition ranges of the single elements 46, 48 are covered by the compound furniture front element 10. In addition thereto, the ledge 50 increases the stability of the frame 11 being constructed as a self-supporting element.

A furniture front element, wherein the filling has a decor effect as well as a functional effect, can be composed e.g. of three single elements of which the lower one and the upper one store diverse decors, whereas the middle one is surrounded by two ledges with H-profile and exercises a functional effect; thus for example in a hotel, includes the name of the hotel or, e.g. a mirror surface.

Figure 11:
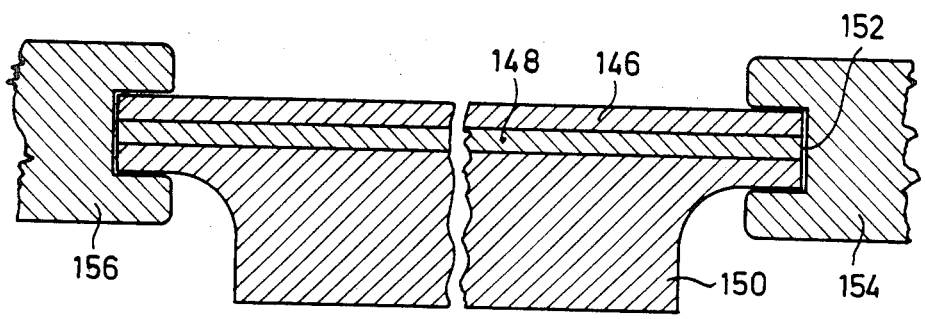
FIG. 11 is a fragmentary perspective view of a frame with filling piece.

FIG. 11 shows another embodiment of the furniture front element according to the invention. Here the filling piece is composed of a total of three elements 146, 148, 150 of which the total thickness exceeds that of the continuous groove of the frame legs 154, 156 and of the other legs (not shown in detail). This is possible as the filling piece as a unit is mounted from one side in the frame with one leg thereof completely removed, preferably a lateral leg member (see FIGS. 13, 14). Consequently it is only necessary to adapt the filling piece in the area of the groove 152 to the width of said groove, whereas in the center portion the filling piece can be of reinforced design, e.g. by means of a padding 150.

The enlarged detail view according to FIG. 5 illustrates a further embodiment of the frame 11, which must be coordinated with the furniture front element 10 according to the invention.

Thus for stability reasons it can be desirable that no leg of the frame 11 should be removed in order to install a filling piece according to the example. For this purpose one side of the frame can have a continuous slit 54 passing into the continuous inner groove. In order to close the slit 54, a key 52 preferably of dove-tailed cross-section, is placed in the respective side of the frame, which key in its position closing the slit 54 is in alignment with the surface of the side of the frame so as to present a uniform flush surface on the outside.

Figure 6:
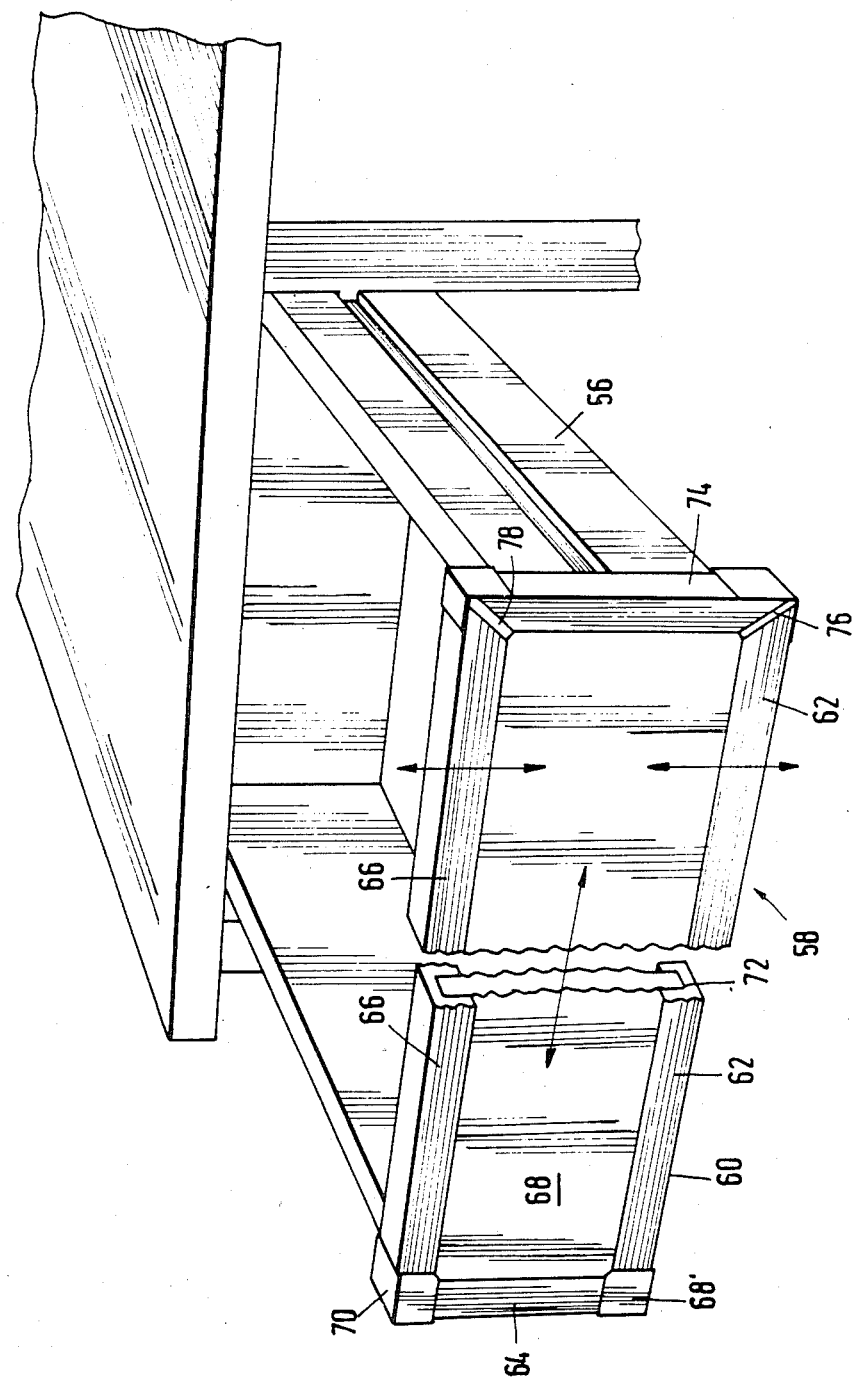
FIG. 6 shows a furniture front element according to the invention that can be used as a drawer front surface.

FIG. 6 shows a detail of a cabinet with drawer 56, of which the visible front surface corresponds to a furniture front element 58 according to the invention, where the different possibilities of variation offered by the invention shall be pointed out in more detail. The left partition of the furniture front element 58 comprises a frame 60 being composed of legs 62, 64 and 66, which in their turn are in butt-joint with the prefabricated corner elements 68 and 70. The filling piece 68', which can be made of single elements arranged one after the other, is completely placed into the indicated continuous inner groove 72. The right partition of the furniture front element 58 presents an embodiment where the legs 62, 66 and 74 do form a true mitre cut and where between the adjacent legs, compensating elements or shims 76 and 78 are arranged to compensate for eventual inaccuracies of fit. At the same time it is obvious that due to the compensating elements 76 and 78 or some other sections displaceable relative to each other (not shown in more detail), the frame has been enlarged in length and height. As illustrated in FIG. 6, the sections 76 and 78 can accomodate an enlargement of the frame to such an extent corresponding to the depth of the continuous groove 72, so that with respect to the filling piece it will not be noticed that an enlargement has taken place.

The variation with respect to height and width can, as mentioned before, also be realized by forming the legs 62, 64, 66 and 74 of individual sections (not shown) being displaceable relative to each other, as described e.g. in connection with the FIGS. 2 and 3. Thus the embodiment example of FIG. 6 makes it clear that the furniture front element according to the invention provides size variability while at the same time offering the advantage that the filling 68 may have diverse decor effects.

FIGS. 7 and 8 are detail views of bathroom furniture 80, which either by inexact measuring or inaccurate manufacture, leaves gaps of an undesired extent to a sidewall 82 as well as to the ceiling 84. Now in order to make the furniture 80 cover the entire wall surface 86, so that there will be no more gaps to the sidewall 82 and the ceiling 84, the furniture front elements 88, 90, 92, 94, 96 according to the invention can be enlarged in such a manner that the leg sections are lengthened - as described above, thus individual sections are displaced relative to each other, as is done in conformance with the teaching of the present invention. Hereby a variation of length or, resp. width of the mentioned furniture front element is possible to such an extent as the filling pieces can be displaced relative to the continuous inner grooves without leaving any free space.

When according to FIG. 7 the bathroom furniture 80 are not yet at a desired distance to the ceiling 84 or, resp. to the sidewall 82, then according to FIG. 8 the same bathroom furniture has been enlarged in its dimensions with respect to the wall 86 to be covered to the desired extent, which is only possible by means of the invention.

FIGS. 12 to 16 show especially essential characteristics of the invention. Thus by the enlarged view according to FIGS. 15 and 16 it shall be indicated that the no-screw joining of the legs 102, 104, 106 is effected by means of the already mentioned eccentric-joint fittings. For this purpose eccentric fittings 128, 130 are embedded in the back sides of the legs 100, 102, 104, 106, which fittings cooperate mechanically with the angle dowels 122. Thus each fitting 128, 130 is provided with a slit extending parallel to the frame level, in which slit the reduced necks 158, 160 of the angle dowels 122 can be inserted. By turning the fittings 128, 130 the angle dowels are now moved toward the fittings. One can easily see that this can take place because the slit is formed in the fittings 162, 164 running eccentrically to the rotation center of the fittings 128, 130. As the angle dowel 122 is engaged with the fitting, rotation of the fittings causes the angle dowel automatically to be drawn in the direction of the pivot of the fittings 128, 130. In this manner a secure joint between the legs 100, 102, 104, and 106 is guaranteed. Since the sections 158, 160 engaging the slits provided in fittings 162, 164 are flattened, there is no chance that the angle dowels can be dislocated relative to the longitudinal axis of their respective legs. Thereby a safe guiding of the legs 100, 102, 104, 106 is guaranteed when actuating the eccentric-angle fittings, i.e. for locking purposes. Due to the fact that the boreholes 126 for the angle dowels 122 and eventually for the additional angle dowels 132 made of synthetic material are aligned to the visible front surface of the frame legs 100, 102, 104, 106, this will finally guarantee that the front surfaces will fit together in alignment. Thereafter no retouching work is required.

Here it should be mentioned that although eccentric-joint fittings are well known, the special geometric adjustment of angle dowels 122 relative to the slits in the fittings 128, 130 is new.

FIGS. 12 and 14 show backsides of a furniture front element according to the invention in different mounting phases. In FIG. 12 a completed furniture front element is shown where the legs 100, 102, 104, 106 are joined by means of the eccentric-joint fittings as described in more detail in connection with FIGS. 15 and 16. Further it should be pointed out that the sectional planes of the legs are sealed in order to prevent moisture from penetrating in the legs especially when used in kitchens. Further the legs 100, 102 and 104 are joined to each other e.g. by means of cold glue, causing simultaneously a sealing of the sectional planes.

In addition, two hinge brackets 166, 168 are embedded in the lateral legs 102, which bands are joined with the body of a cabinet so that the door can be opened and shut. Now in order to exchange the filling piece 170 or, respectively, rearrange the elements forming the filling piece, the lateral leg 106 is removed from the adjacent upper and lower legs 100 and 104. For this purpose only the eccentric-angle fittings on leg 106 must be unbolted. After removal of the leg 106 (FIG. 13) the filling piece 170 can be removed by hand so that a new decor element can be inserted. Subsequently the leg 106 is against locked with the adjacent legs 100 and 104 by means of the eccentric-joint fittings in order to have again a finished door frame according to FIG. 12.

From this description it will be clear how the decor effect of a furniture front element according to the invention can be varied by means of rather simple operations without impairing its stability or functionability in any manner.

It will be obvious that the invention can be used for various articles of furniture, including kitchen cabinets and the like. The invention should not be limited to specific situations and dimensions. Other modifications can be made within the scope of the appended claims by one skilled in the art.

According to the invention furniture front elements are provided being produced on a quasi large-scale basis where craftsmen supply made-to-measure work.

What is claimed is:

1. A method for manufacturing a front element for furniture or the like which includes a four sided perimeter frame and a filling panel received within the frame, said method comprising the steps of;
    (a) cutting elongated frame pieces of wood or plastic to selected profile and length and having mitered corners, and sealing the surfaces cut,
    (b) providing a filling piece receiving groove extending longitudinally along one face of each piece,
    (c) forming at least one short hole extending in a longitudinal direction in each end of each frame piece extending from the mitered face,
    (d) forming at least one additional bore hole of a diameter greater than the first mentioned bore hole adjacent each end of each frame piece extending from and normal to the rear face thereof and terminating within the piece and intersecting the first mentioned bore hole at a distance spaced longitudinally from said mitered face thereof, (e) inserting a rotatable eccentric fitting within each of said additional bore holes, (f) interconnecting three of said frame pieces by means of right angle dowel pieces inserted in adjoining holes in said mitered faces, each dowel piece having a reduced neck spaced inwardly from its end, (g) rotating said eccentric fittings into the reduced necks of said dowels of the three frame pieces to draw the same tightly together, (h) inserting at least one generally planar filling piece within the groove defined by the three interlocked frame pieces, (i) joining the fourth frame piece to the partially assembled frame about the exposed edge of said filling piece by insertion of the right angle dowels associated therewith into the first mentioned holes in the adjacent frame pieces, and (j) rotating the remaining eccentric fittings to tighten the assembly about the filling piece.

2. A method according to claim 1, and further including the step of affixing a plurality of hinge brackets to the rear face of one of said frame pieces so the assembly may be used as a cabinet door.

* * * * *